July 9, 1963 R. A. TOUSIGNANT ETAL 3,096,873
CONTINUOUSLY-OPERATING MOLDED ARTICLE-REMOVING
MEANS FOR DRYING FORMS
Filed April 26, 1962 6 Sheets-Sheet 5
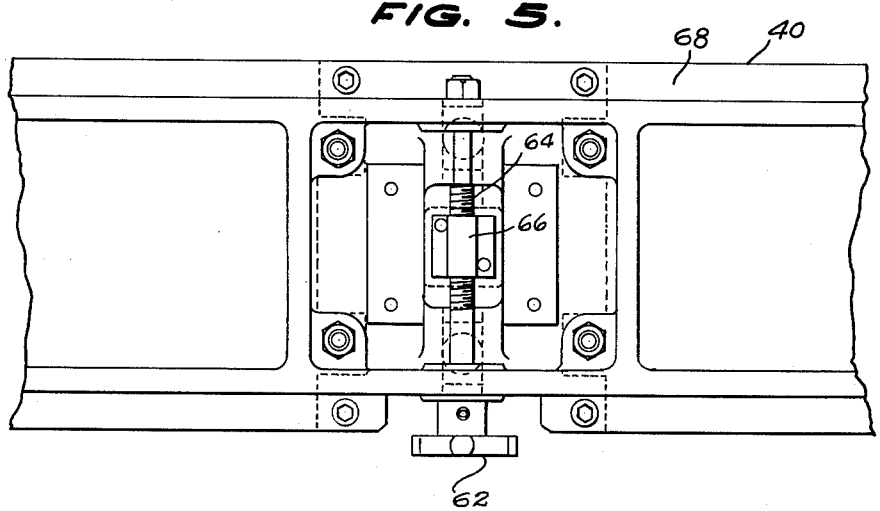
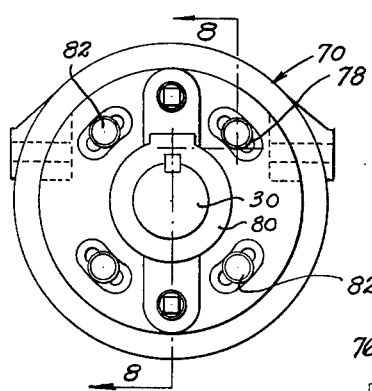
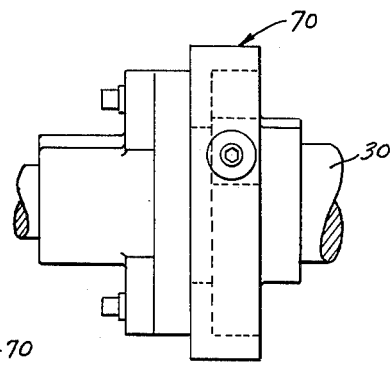
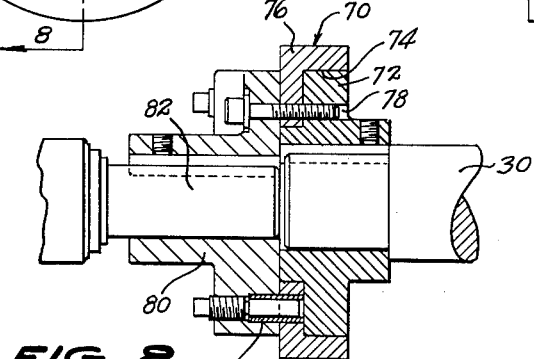
INVENTORS.
ROLAND A. TOUSIGNANT,
HAROLD S. CRANE,
BY
KARL W. FLOCKS
ATTORNEY.

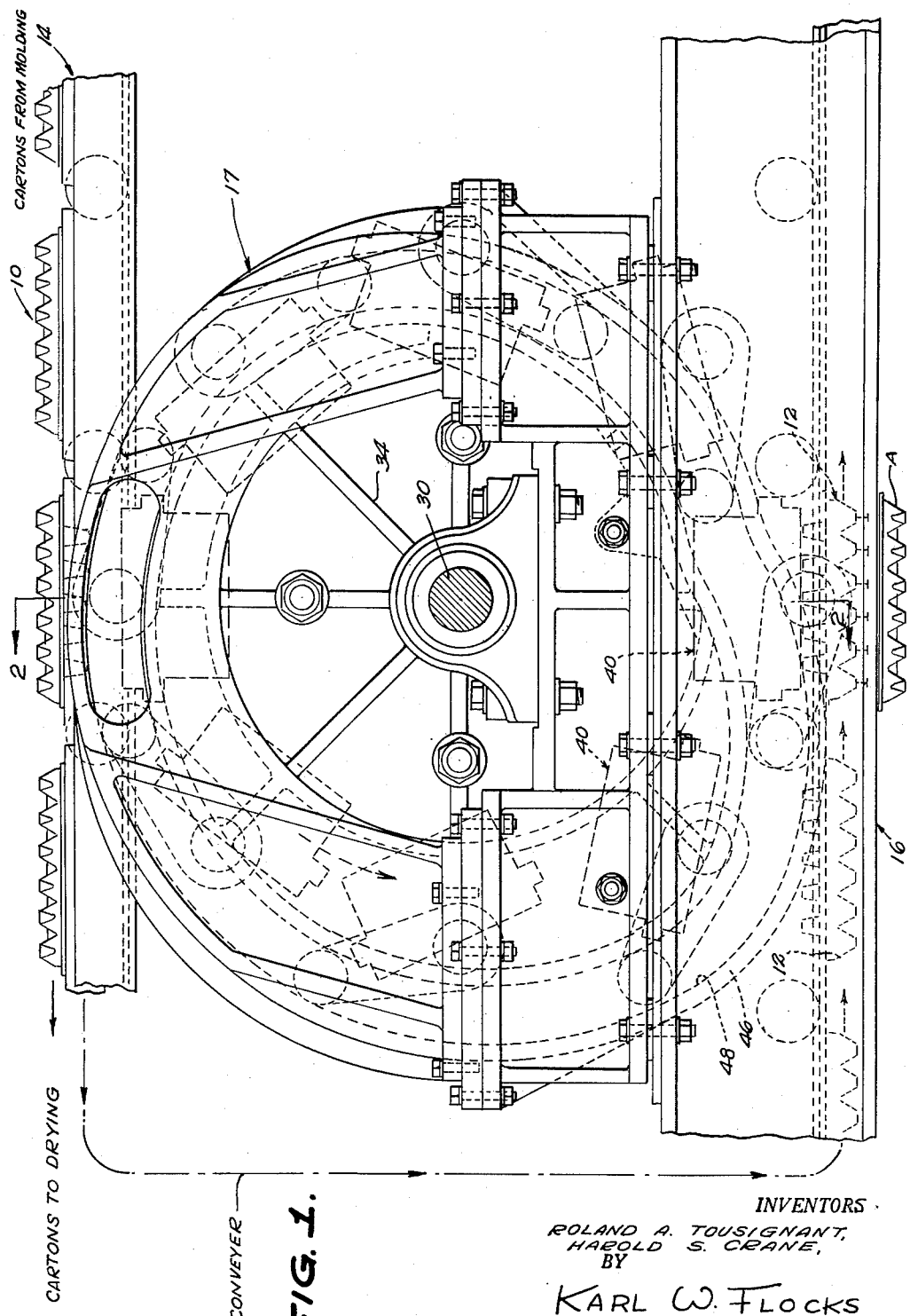

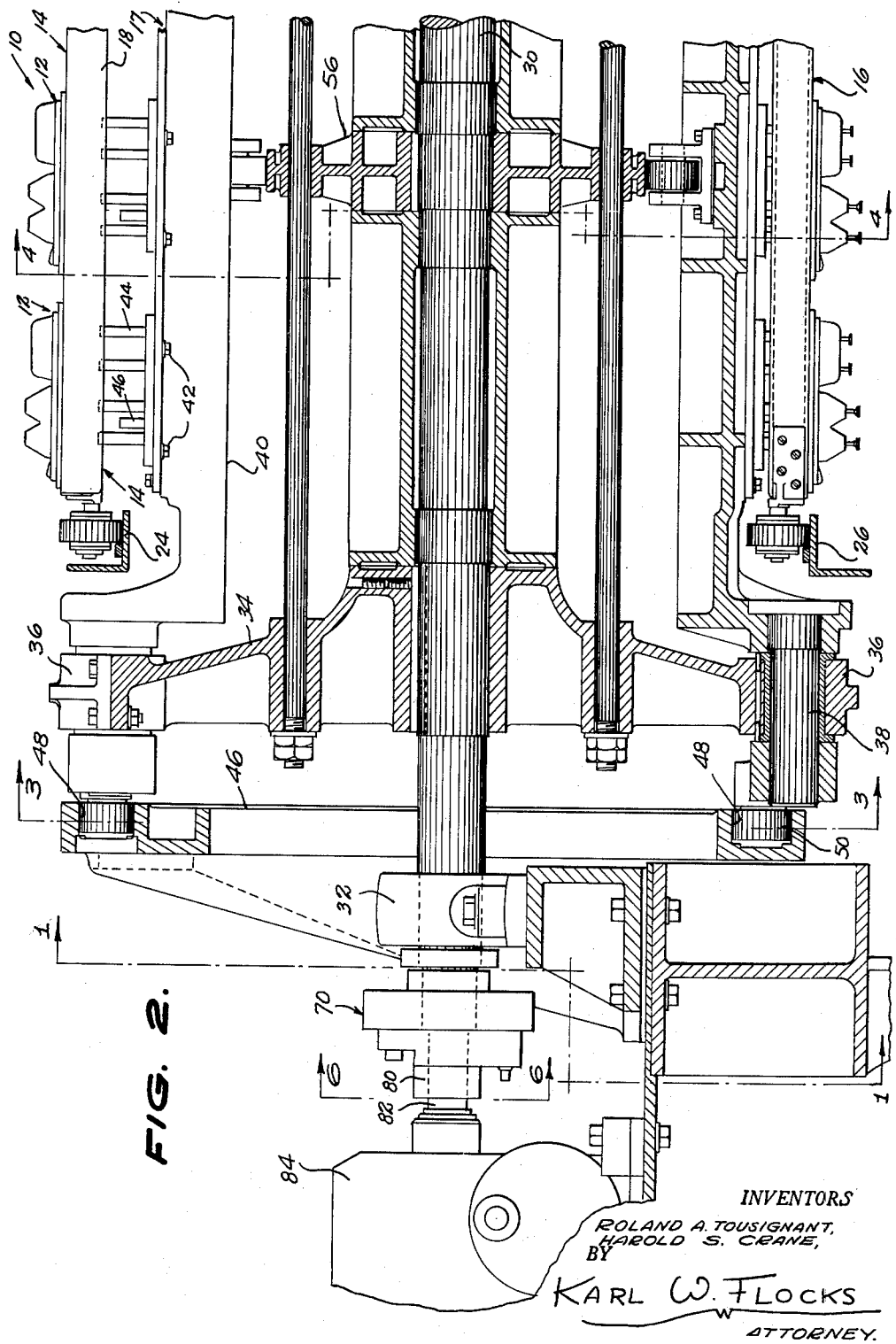

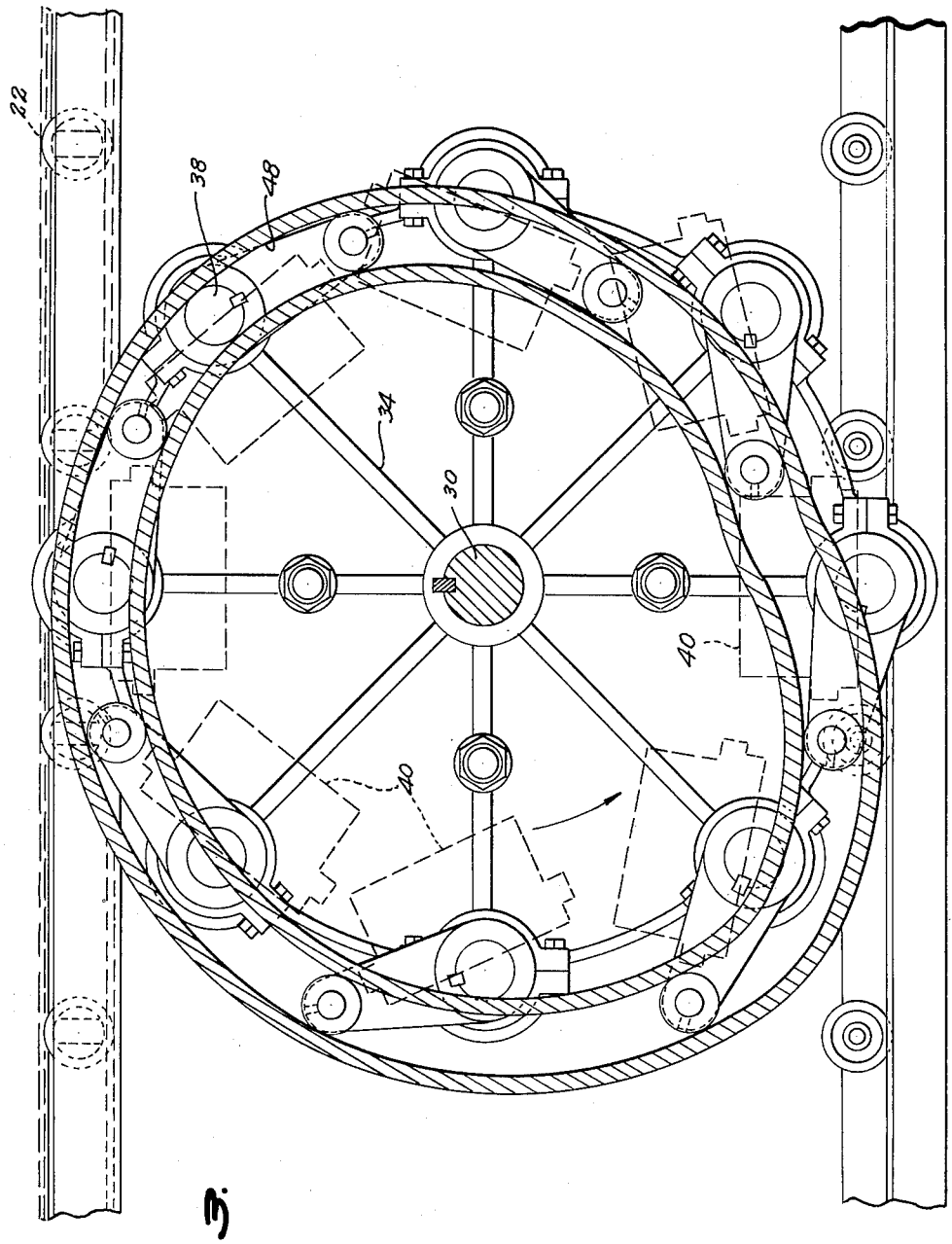

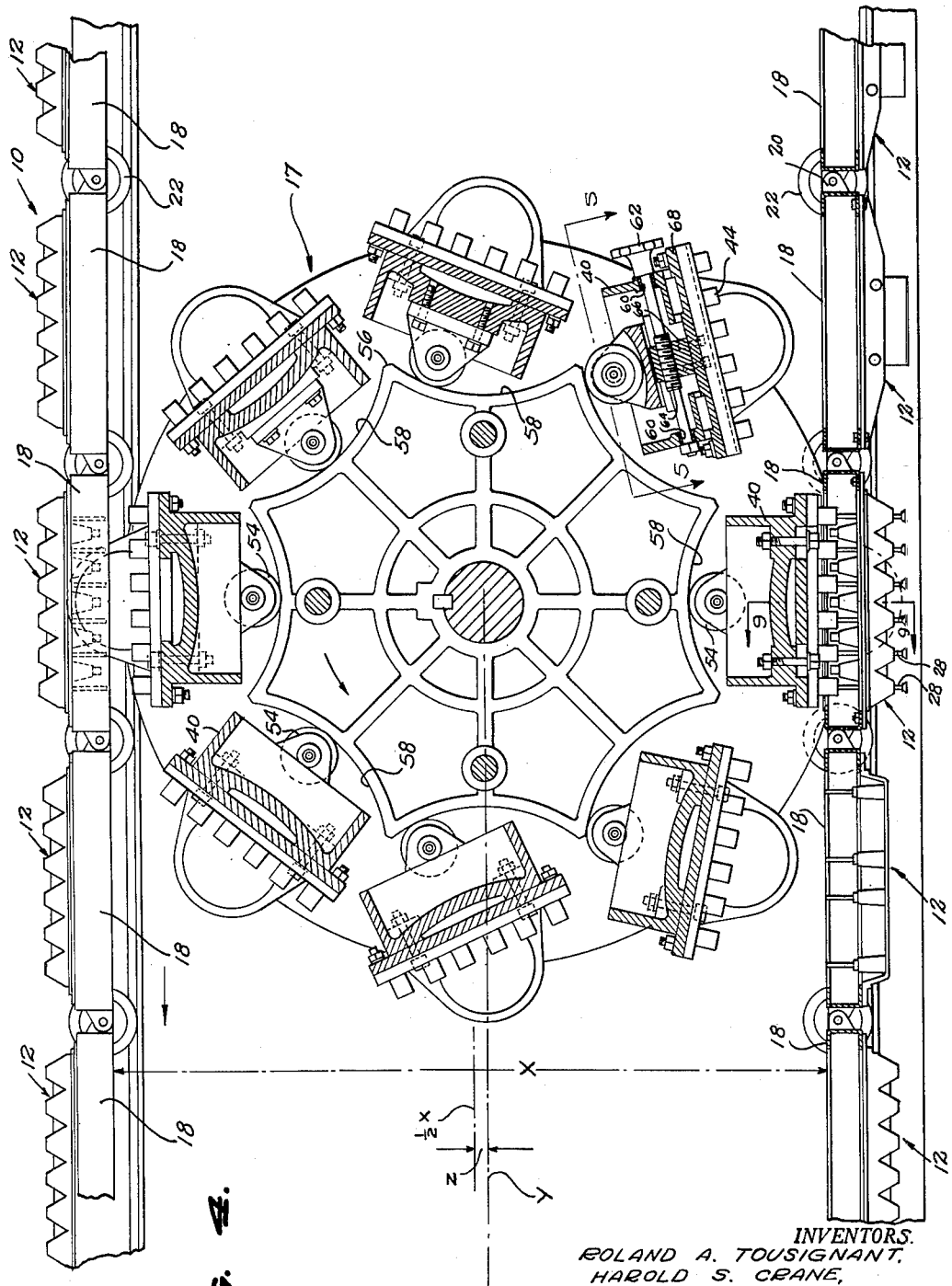

INVENTORS.
ROLAND A. TOUSIGNANT,
HAROLD S. CRANE,
BY
KARL W. FLOCKS
ATTORNEY.

United States Patent Office 3,096,873
Patented July 9, 1963

3,096,873
CONTINUOUSLY-OPERATING MOLDED ARTICLE-REMOVING MEANS FOR DRYING FORMS
Roland A. Tousignant, Wilbraham, and Harold S. Crane, Palmer, Mass., assignors to Diamond National Corporation, New York, N.Y., a corporation of Delaware
Filed Apr. 26, 1962, Ser. No. 190,298
7 Claims. (Cl. 198—185)

The present invention relates generally to apparatus for continuously producing molded articles, and more particularly to an improved continuously-operating means for removing a continuously advancing series of molded articles or groups of articles, such as molded paper pulp egg cartons, trays, or the like, from an endless conveyor and stripping such articles from drying forms.

High speed production methods desirably practiced in the paper pulp molding industry require continuous, uninterrupted operation of the production facilities involved. Generally, the trend in paper pulp molding equipment is to continuously operate pulp molding machines, synchronized with means to remove the deposited articles on molding dies of the molding machine and transfer the articles to drying forms. Continuously operating conveyor means transport the drying forms with the articles thereon through a drier, and just as important, continuously operating means are provided to remove the dried articles from the forms.

As in any mechanized and high rate of production system, the speed of the pulp molding system can be no greater than the maximum output of the slowest essential operating unit.

A primary object of this invention is to provide apparatus which affords means whereby the dried articles may be removed from a continuously operating conveyor at substantially the same speed of operation of the conveyor and without imposing excessive weight, high torque or unbalancing of the various operator mechanisms.

Generally considered, the improved apparatus of the present invention involves an endless, link-type conveyor driven at a constant speed, by which article-carrying forms are transported along parallel horizontal reaches, as through an elongated drying oven, and a continuously rotating article-stripping unit which travels at substantially the same rate of travel and in the same direction as the conveyor, and on an axis of rotation offset with respect to the distance between the horizontal reaches of the conveyor to accordingly cause a plurality of normally retracted stripper elements to be projected normal to and beyond the normal of travel of one of the conveyor reaches to accordingly cause dried pulp articles to be progressively and continuously removed from the drying forms.

A further object of the present invention is to provide a novel, continuously operating stripper unit in conjunction with a continuously operating endless conveyor upon which drying forms are mounted, and in which the drying forms include normally retracted and projectable stripper elements which will permit dried molded pulp articles to be continuously removed from the drying forms when the drying forms are disposed in a predetermined position.

A still further object of the present invention is to provide novel continuously operating molded article-removing means for removing articles from drying forms mounted on a continuously operating endless conveyor, in which the continuously operating removing means comprises a support member mounted on an axis of rotation offset with respect to the distance between horizontal upper and lower runs of the endless conveyor, and in which cam means are provided for providing an oscillatory movement to abutment portions on the support member to cause the abutment portions to be disposed and oriented into juxtaposed overlying relationship with respect to spring-urged ejectment elements operable to protrude beyond the support surface of drying forms on the conveyor to accordingly remove articles disposed on the drying forms.

The foregoing statements are indicative in a general way of the nature of the invention. Other and more specific objects will be apparent to those skilled in the art. A single embodiment of the invention is presented herein for the purpose of illustration. It will be appreciated that the invention may be incorporated in other modified forms coming equally within the scope of the appended claims.

In the drawings:

FIG. 1 is a vertical section taken substantially on the plane of line 1—1 of FIG. 2, portions of the apparatus being removed and shown diagrammatically for the purposes of clarity, and showing fragmentary portions of upper and lower conveyor reaches and the relative positions of abutment elements of the continuously operating pulp article-removing unit;

FIG. 2 is a vertical section taken substantially on the plane of line 2—2 of FIG. 1;

FIG. 3 is a vertical section taken substantially on the plane of line 3—3 of FIG. 2, showing details of the cam means for the abutment elements of the invention and the relative positions of the abutment elements afforded by the cam means;

FIG. 4 is a vertical section taken substantially on the plane of line 4—4 of FIG. 2, showing details of arcuate guide surfaces concentric to axes of oscillation of the abutment elements of the invention;

FIG. 5 is a fragmentary, enlarged plan view looking substantially from the plane of line 5—5 of FIG. 4, showing details of the adjustment mechanism of the abutment elements of the invention;

FIG. 6 is an enlarged vertical section taken on the plane of line 6—6 of FIG. 2, showing details of the synchronizing mechanism of the continuously operating article-removing mechanism;

FIG. 7 is a side elevation of FIG. 6;

FIG. 8 is a section taken substantially on the plane of line 8—8 of FIG. 6;

Figure 9:
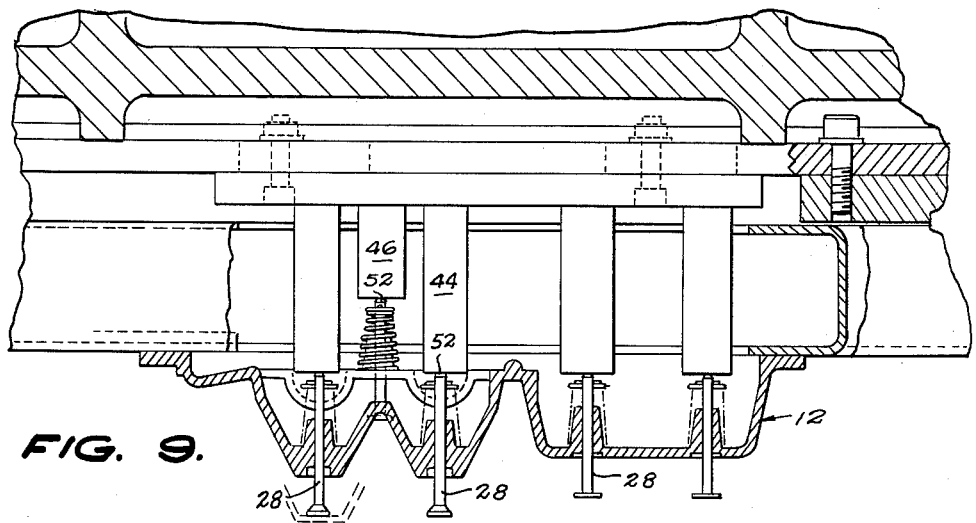
FIG. 9 is a further enlarged fragmentary section taken substantially on the plane of line 9—9 of FIG. 4, showing details of the ejectment mechanism of one of the drying forms of the apparatus.

As mentioned above, the present apparatus has a general object, the stripping of molded pulp articles, such as egg cartons, from article mounting drying forms on a continuously and uniformly moving longitudinal conveyor, by which conveyor the articles have previously been transported to an elongated drying chamber or oven. The drying forms have the wet molded articles transferred thereon from a rotary molding drum or the like, the forms being engaged by dies on the drum as they are advanced by the conveyor. Apparatus of the general type is disclosed in United States Letters Patent to Comstock No. 2,738,868.

Referring to the drawings in detail, and first considering FIGS. 1, 2, and 4, the apparatus includes an elongated, endless link or chain-type conveyor indicated generally at 10 upon which a plurality of transversely disposed, article-carrying forms 12 are continuously translated, in an upper horizontal reach 14 of the conveyor path, through a suitable drying chamber (not shown), see FIG. 1, continuing therefrom along a lower horizontal conveyor reach 16, and at this time the drying forms are inverted and the articles will be suitably dried to be removed by continuously operating molded article-removing means indicated generally at 17. The dried articles will be conveyed away from the conveyor reach 16 in any suitable manner, by means of chutes, conveyors, etc. (not shown).

The conveyor 10 and drying forms are of the character disclosed in United States Letters Patent No. 2,703,041. The conveyor form construction comprises a longitudinal succession of transversely elongated, substantially rectangular frames 18, preferably of hollow aluminum construction, and each of these frames has a transversely aligned row of suitably shaped article-drying forms 12 secured thereto, in sealed relation to open bottoms communicating with the space between the conveyor reaches 14 and 16. Molded articles A will be deposited on the drying means and dried in any suitable manner from suitable continuously operating molding apparatus (not shown).

The rectangular frames 18 are connected to each other by means of overlapping, transversely apertured ears 20 providing means for supporting roller elements 22 located at opposite ends of the frames, the rollers being supported in the path of travel of the respective reaches by means of suitable upper and lower track elements 24 and 26, see FIG. 2, for example.

Figure 10:
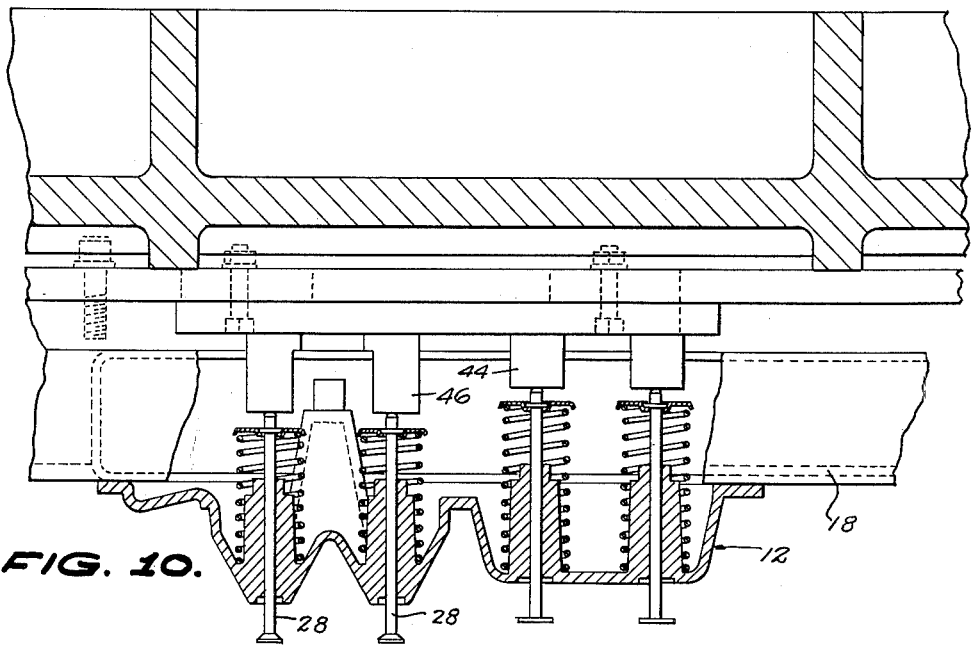
FIG. 10 is a view similar to FIG. 9, showing another type of drying form used in the invention.

The drying forms 12 include a plurality of normally retracted stripping pins 28 suitably located within the forms depending upon the type of article being removed therefrom; see FIGS. 9 and 10, for example. The stripping pins 28 will be periodically engaged by suitable abutment portions of the continuously operating molded article-removing means 17 as will subsequently be described in detail.

Before describing the unit 17, attention is directed to FIG. 4. Indicated at X is the distance between the inner surfaces of the frames 18. Indicated at 1/2X is a plane equi-distant between the inner surfaces of the frames X and it will be noted that a plane Y is closer to the inner surfaces of the lowermost frames 18 by the distance Z. This particular dimensional relationship or "offset" permits the continuously operating article-removing means 17 to be in constant timed relationship with respect to the conveyor 10, i.e., drying forms 12, without affecting the stripping pins 28 when the forms are moving along the upper reach 14 above unit 17, but insures removal of the articles A when the drying forms are disposed in the dotted line position shown in FIG. 1, for example.

The unit 17 comprises a support shaft 30, only one end being shown in FIG. 2, for example, which is suitably supported in bearing assemblies 32 at opposite ends, on an axis of rotation substantially parallel to the upper and lower conveyor reaches 14 and 16. Suitably keyed on opposite ends of the shaft 30 are support spiders 34 including a plurality of radially disposed and circumferentially spaced bearing portions 36. Axially aligned bearings 36, at opposite ends of the unit, have journaled therein support shaft portions 38 of substantially U-shaped, elongated abutment elements 40, which have fixedly secured at 42 a plurality of elongated abutment portions 44 and 46 of different lengths according to the location and length of the ejector pins 28 and depending upon the type of article being molded.

Circumposed about the axis of rotation defined by the shaft 30, which coincides with the previously mentioned plane Y, which is disposed closer to the lower conveyor run 16 than the upper run 14, is a suitably supported cam track 46 which includes a continuous groove portion 48 opening toward and guidingly receiving the terminal end 50 of the shaft 38 of the abutment element 40. The cam track 48 is designed to orient the abutment portions 44 and 46 in juxtaposed overlying relationship with respect to the inner ends 52 of the ejector pins 28, see FIGS. 9 and 10, for the purpose of extending them beyond the outer surface of the forms 12 and accordingly remove a molded article A therefrom, as illustrated in FIG. 1.

The abutment elements 40 have depending from the inner surface thereof suitably supported, anti-friction roller elements 54. Keyed on the shaft 30, see FIGS. 2 and 4, is a support or star wheel 56 which includes a plurality of arcuate support surfaces 58, each of which is concentric to the axis of oscillation defined by support shaft portions 38 of the abutment elements 40. The anti-friction rollers 54 are guidingly received on the arcuate surface portions 58 as the abutment elements 40 are oscillated by the cam 46 in the manner clearly illustrated in FIG. 4, for example.

Considering FIGS. 4 and 5, the abutment elements 40 include opposed bearing portions 60 in which a manually adjustable shaft 62 is journaled, the shaft 62 including an intermediate externally threaded portion 64 upon which is mounted an internally threaded portion 66 fixed to a plate 68 from which the abutment portions 44 and 46 depend. The adjustable shaft 62 facilitates proper engagement and orientation of the abutment portions 44 and 46 with respect to the inner ends 52 of the ejector pins 28.

The support shaft 30 of the unit 17 projects laterally beyond the cam track 46, and is secured to a timing unit indicated generally at 70, see FIGS. 2 and 6–8. The unit 70 includes a first mounting disc 72 received within an annular recess 74 of a coupling housing 76. The disc 72 includes a plurality of transverse arcuate slots 78, and a mounting hub 80 juxtaposed on the side of the housing 76 opposite the disc 72 has a plurality of bolt elements 82 extending therethrough and received in the slots 78. The mounting hub 80 receives therein a suitably keyed end portion 82 of the drive shaft of a prime mover or motor means 84.

The linear speed of the abutment elements 40 will be approximately or substantially the same as the rate of travel of the lower conveyor run 16 of the conveyor 10. The unit 70 will facilitate adjustment of the timed movement of the orbital path of the abutment elements 40 in relation to the speed of the conveyor 10, i.e., the drying forms 12, to insure proper displacement of the stripper pins 28. The elements 80 and 76 are maintained in fixed adjusted relationship by means of suitable adjusting screws 86.

Thus, there has been disclosed continuously operating article-stripping means which eliminates reciprocating parts and the like, and automatically and in a practical manner strips dried pulp articles from a continuously moving conveyor operating at a relatively high speed. The continuous rotary motion of the continuously operating unit enables the apparatus to operate at a relatively high speed, and permits the production of the molded articles to be maintained at a relatively high rate without involving high torque and unbalancing generally involved where reciprocating type mechanisms are utilized.

It will be obvious to those skilled in the art that various changes may be made without departing from the spirit of the invention shown and, therefore, the invention is not limited to what is shown in the drawings and described in the specification but only as indicated in the appended claims.

What is claimed is:

1. Apparatus for continuously removing molded pulp articles from drying forms comprising in combination endless conveyor means including opposed conveyor runs, a plurality of spaced drying forms for molded pulp articles spaced longitudinally along said conveyor means, said drying forms including normally retracted, extendable portions for removing a molded pulp article therefrom, and means for engaging said normally retracted, extendable portions to extend the same for removing a molded article disposed on said drying forms, said last mentioned means comprising a member mounted on an axis of rotation disposed between said opposed conveyor runs substantially closer to one of said runs than the other run, the one conveyor run and said support member being continuously movable in a common direction with the drying forms said member including abutment portions having substantially the same linear speed as said one conveyor run for operating said normally retracted, extendable portions.

2. Apparatus as set forth in claim 1; wherein said conveyor runs are disposed in substantially horizontal, parallel relation.

3. Apparatus as set forth in claim 2; including cam track means circumposed about the axis of rotation of said support member and engaged with said abutment portions for guiding and juxtaposing the abutment portions into overlying relation on said drying form to extend said normally retracted extendable means.

4. Apparatus as set forth in claim 3; said support member comprising a plurality of radially disposed and circumferentially spaced elements terminally journaled on said support member on axes of rotation parallel to the axis of rotation of said support member, said spaced elements including said abutment portions and having a follower portion at one end guidingly engaged with said cam track means for periodic oscillation simultaneously as said support member is rotated.

5. Apparatus as set forth in claim 4; said support elements including anti-friction means depending toward the axis of rotation of said support member, a guide track on said support member having arcuate guide surfaces concentric to the axes of oscillation of said support elements and guidingly engaging said anti-friction means.

6. Apparatus as set forth in claim 1; said support member being adjustably mounted for adjusting the point of coincidence between said abutment portions and said extendable portions of said drying forms.

7. The apparatus of claim 1; said drying forms being adjustable tangentially relative to the path of travel thereof for insuring engagement between said abutment portions and said extendable portions.

No references cited.